(12) United States Patent
Fox

(10) Patent No.: US 6,363,143 B1
(45) Date of Patent: Mar. 26, 2002

(54) GRAPHICAL AND SCHEDULE-BASED DEFINITION OF A CALL-COVERAGE PATH

(75) Inventor: John C. Fox, Louisville, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/233,009

(22) Filed: Jan. 19, 1999

(51) Int. Cl.⁷ .................................................. H04M 3/42
(52) U.S. Cl. ........................ 379/211.01; 379/211.02; 379/201.03
(58) Field of Search ................... 379/211.01, 211.02, 379/212.01, 213.01, 201.01–201.05, 201.12, 207.02, 93.01

(56) References Cited

U.S. PATENT DOCUMENTS

| | | | | |
|---|---|---|---|---|
| 5,434,908 A | | 7/1995 | Klein | 379/88 |
| 5,440,620 A | * | 8/1995 | Slusky | 379/100.07 |
| 5,745,561 A | | 4/1998 | Baker et al. | 379/265 |
| 5,867,568 A | * | 2/1999 | Ackerman et al. | 379/211.02 |
| 5,953,400 A | * | 9/1999 | Rosenthal et al. | 379/202.01 |
| 5,966,435 A | * | 10/1999 | Pino | 379/221.13 |

FOREIGN PATENT DOCUMENTS

EP 0510411 4/1992 ............ H04M/3/42

OTHER PUBLICATIONS

AT&T, *G3V2 Feature Description*, Document #555–230–204, Issue: Jul. 1993. Call Coverage—Feature Availability.

AT&T, *True Connections*ᔆᴹ.

* cited by examiner

Primary Examiner—Ahmad Matar
Assistant Examiner—Benny Q. Tieu
(74) Attorney, Agent, or Firm—David Volejnicek

(57) ABSTRACT

A user defines their own call-coverage path (141) or other call-processing information by drawing a graphical flowchart (200) using an interactive GUI of a PC-based software application (140). Once the flowchart is drawn, it is activated with the push of a button, and that flowchart is now the logic that is applied to a user's coverage path. The call-coverage path (the flowchart) remains resident on the user's PC (103) and the communications switching system (101) retrieves call-coverage information from the PC whenever it must perform call coverage for that user. A plurality of different flowcharts may be drawn and stored on the PC, and then recalled and activated at any time as the present call-coverage path for the user. A call-coverage path may be activated by and/or for the user from anywhere on a LAN (104), WAN, or the Internet, so that the call-coverage path my be controlled remotely. Furthermore, the coverage-path system has the ability to consult with an on-line personal scheduling system 145 (such as a calendar program) executing on the user's PC or another machine networked with the user's PC. A call-coverage path may then be administered to contain logic (203) that refers to the personal scheduling system to obtain data, rather than having to have the data defined within the coverage-path system itself.

18 Claims, 4 Drawing Sheets ns user fea-

GRAPHICAL AND SCHEDULE-BASED DEFINITION OF A CALL-COVERAGE PATH

TECHNICAL FIELD

This invention relates to telecommunications user features.

BACKGROUND OF THE INVENTION

Call coverage is a call-redirection feature that provides for a plurality of alternative-destination telephone numbers (or other telecommunication addresses) to which the telecommunications system can sequentially try to deliver a call (or other communication) intended for a principal when the call cannot be completed to the principal telephone number or when the principal elects not to receive the call at the principal telephone number. The sequence of numbers is referred to as a path.

Recently, telecommunications systems have begun to provide users with the capability of programming their own call-coverage paths, and of doing so via a graphical user interface (GUI). An illustrative example thereof is described in U.S. Pat. No. 5,745,561. The system there described allows a principal to use a GUI interface to program (administer) multiple independent call-coverage paths for the principal's telephone number, and also to program selection criteria for each path such that selection of an individual call-coverage path for an individual call to the principal's telephone number depends on which path's selection criteria are matched by the parameters of the individual call.

The present practice for updating a call-coverage path to accurately reflect an individual's schedule of availability and location requires the individual to ender data into the coverage-path system. This falls short of a completely desirable solution in that, if a person's schedule changes, they must enter that information into both their personal scheduling software (such as a calendar) and the coverage-path system. Also, the present practice for administering call-coverage paths typically involves one of the following methods: choosing from a list of pre-set coverage paths; editing the coverage paths or their selection criteria (including any logical decisions to be made) in a text-based form; or editing the coverage path through a phone-in interface. All of these methods are somewhat limiting in that they either have a limited capability for specifying rules, or the resulting specified logic is difficult to visualize due to the text-form-based presentation.

SUMMARY OF THE INVENTION

This invention is directed to solving these and other problems and disadvantages of the prior art. Illustratively according to the invention, a call-coverage path is defined by drawing a graphical flowchart by using an interactive graphical user interface (GUI) of a PC-based software application. Once the flowchart is drawn, it is activated with the push of a button, and that flowchart is now the logic that is applied to a user's coverage path. The call-coverage path (the flowchart) remains resident on the user's PC and the communications system retrieves call-coverage information from the PC whenever it must perform call coverage for that user. A plurality of different flowcharts may be drawn and stored on the PC, and then recalled and activated at any time as the present call-coverage path for the user.

A call-coverage path may be activated by and/or for the user from anywhere on a LAN, WAN, or the Internet, so that the call-coverage path may be controlled remotely. Furthermore, the coverage-path system has the ability to consult with an on-line personal scheduling system (such as a calendar program) executing on the user's PC or another machine networked with the user's PC. A call-coverage path may then be administered to contain logic that refers to the personal scheduling system to obtain data, rather than having to have the data defined within the coverage-path system itself. This allows the user to enter personal schedule information in only one place—the scheduling system—yet have their call-coverage path be based upon that information. In short, the invention as characterized above solves the prior-art's problems that call-coverage paths must be directly updated with new information when the user's schedule changes, and that potentially-confusing logic often makes administration of a call-coverage path difficult.

Generally according to one aspect of the invention, call processing for a plurality of users served by a switching system is effected as follows. In response to a first call, to a communications terminal (e.g., a telephone) of a first one of the users for whom the call is destined, the switching system obtains call-processing (e.g., call-coverage) information of the first user from a first computer, distinct from the switching system, of the first user by communicating with the first computer. In response to obtaining the first call-processing information, the switching system handles the first call as directed by the first call-processing information. Then in response to a second call, to a communications terminal of a second one of the users for whom the call is destined, the switching system obtains call-processing information of the second user from a second computer, distinct from the switching system and from the first computer, of the second user by communicating with the second computer. In response to obtaining the second call-processing information, the switching system handles the second call as directed by the second call-processing information. In other words, the switching system obtains each user's call-processing information from that user's own computer.

Generally according to another aspect of the invention, call processing for a plurality of users in a communications system comprising telecommunications terminals of a plurality of users, a switching system serving the plurality of users and connected to their telecommunications terminals, and a plurality of computers distinct from and connected to the switching system and each corresponding to a different one of the users, is effected as follows. At least some of the users each store their own call-processing (e.g., call-coverage) information on their own computer. In response to a call to a communications terminal of any one of those users for whom the call is destined, the switching system obtains the call-processing information for the one user from the one user's computer by communicating with the one user's computer. And in response to obtaining the call-processing path information from the one user's computer, the switching system handles the call as directed by the obtained call-processing information.

Generally according to yet another aspect of the invention, call processing for a user in a communications system comprising at least one telecommunications terminal of the user, a switching system serving the user and connected to the telecommunications terminal, and a computer of the user distinct from and connected to the switching system, is effected as follows. The user stores in the computer the user's own call-processing (e.g., call-coverage) information for processing exclusively calls to the telecommunications terminal of the user and to no other users' terminals in the switching system. In response to a communication from the switching system seeking call-processing (e.g., call-coverage) information exclusively for a call to the user's telecommunications terminal and not for calls to other users' terminals, the computer returns the stored call-processing information to the switching system to enable it to handle the call as directed by the user's stored call-processing information.

Preferably, a user defines their own call-coverage path on their computer via a graphical user interface, by defining a flowchart comprising interconnected route steps. The first route step corresponds to a destination point of a call (e.g., the user's telecommunications terminal), and each subsequent route step corresponds to a different coverage point in the call-coverage path. Each route step specifies the conditions for selecting a connected one of the other route steps. In communicating with the computer, the switching system reports a state of the call to the computer. The computer applies the reported state to the flowchart to determine call-coverage treatment of the call, and returns the determined treatment to the switching system. If the switching system is unable to complete the call by handling it as directed by the returned treatment, it reports a new state of the call to the computer. The computer then applies the reported new state to the flowchart to determine further call-coverage treatment of the call, and returns the further treatment to the switching system. If the stored call-coverage path is a function of a schedule of the user and the computer is executing a scheduling program that defines the schedule of the user, the computer responds to the communication from the switching system by obtaining the user's schedule information from the scheduling program, using the obtained schedule information to determine call coverage treatment of the call, e.g., by applying the scheduling information to the flowchart, and then returning the determined call coverage treatment to the switching system.

The invention encompasses methods, apparatus, and storage media containing programs for computers to effect the methods. While methods comprise steps of the just-characterized procedures, the apparatus effects the methods steps. An apparatus preferably includes an effector—any entity that effects the corresponding step, unlike a means—for each step.

These and other features and advantages of the invention will become more evident from the following description of an illustrative embodiment of the invention considered together with the drawing.

DETAILED DESCRIPTION

Figure 1:
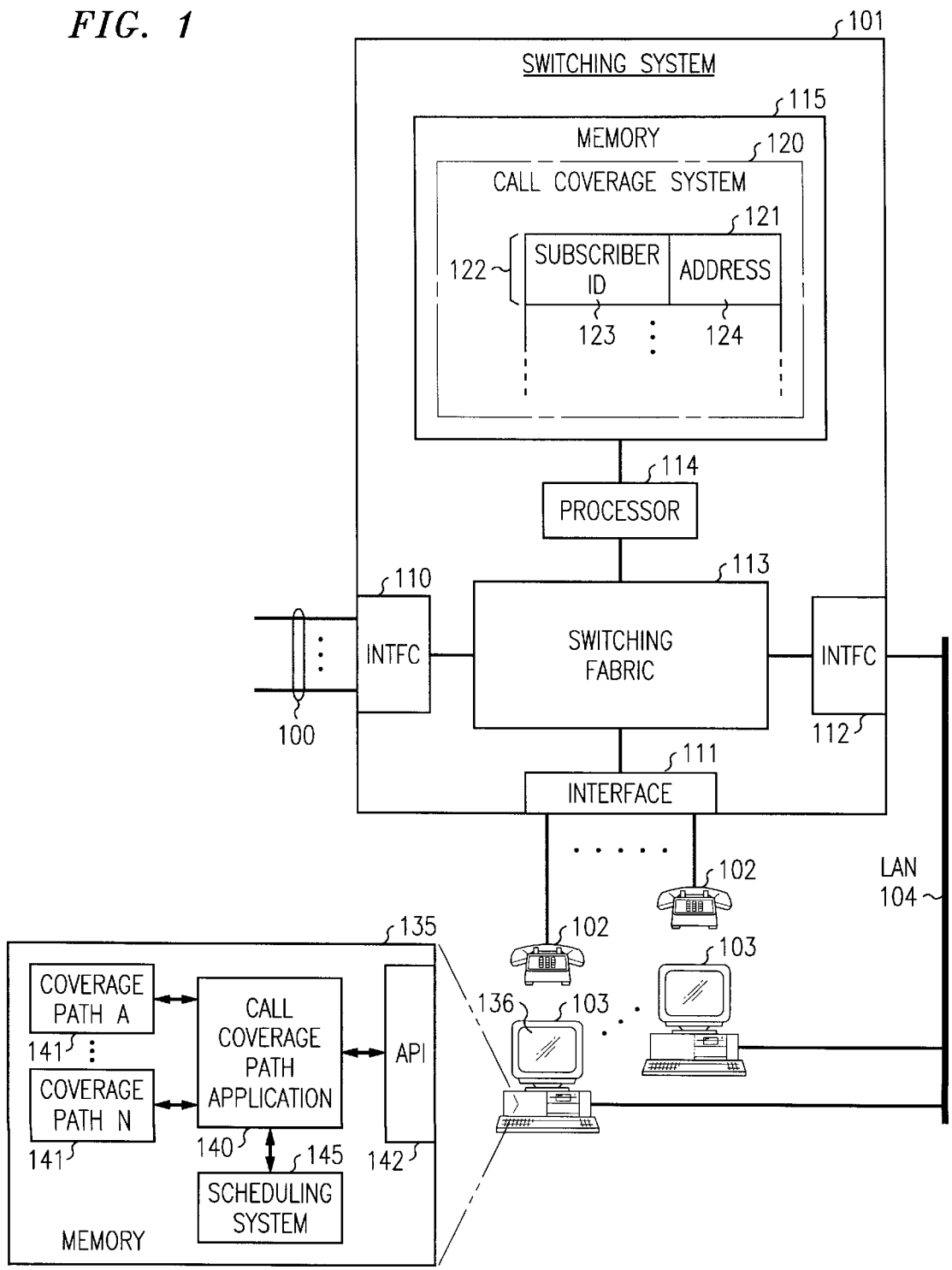
FIG. 1 is a block diagram of a telecommunications system that includes an illustrative embodiment of the invention.

FIG. 1 shows an illustrative telecommunications system implementing an illustrative embodiment of the invention. It comprises a switching system 101, such as a central office switch or a private branch exchange or a multimedia communications exchange, interconnecting a plurality of user's telecommunications terminals 102, such as telephones, with each other and with external communications links 100, such as telephone trunks. Switching system 101 also connects to a plurality of user's computers 103, such as personal computers (PCs), via a local area network (LAN 104), such as a portion of the Internet. Alternatively, a user's telecommunications terminal 102 and computer 103 may be connected to switching system 101 by a common communications link—either a telephone line or a data network—and may even comprise a common instrument—e.g., a telephony-enabled computer. As is conventional, switching system 101 comprises an interface 110, such as trunk ports, to links 100, an interface 111, such as line ports, to terminals 102, and an interface 112, such as a LAN port, to LAN 104, interconnected by a switching fabric 113 that operates under control of a processor 114 executing control programs from a memory 115. Included among the control programs in memory 115 is a call-coverage system 120 that provides call coverage for communications directed to subscribers of switching system 101 (i.e., users of terminals 102). A conventional call-coverage system includes data defining the call-coverage path, if any, for each subscriber. In contrast, system 120 includes a list 121 of pointers to where switching system 101 can obtain the call-coverage information for individual subscribers. Illustratively, each pointer is a list entry 122 containing a subscriber identifier 123, such as the subscriber's telephone extension number, and an address on LAN 104 where that subscriber's call-coverage-path information may be found. Illustratively, call-coverage system 120 may be a hybrid that contains data defining the call-coverage paths for some subscribers and list entries 122 for other subscribers. Entries 122 are created and deleted dynamically by corresponding subscribers.

Subscribers who have corresponding entries 122 in system 120 are each presumed to be equipped with a computer 103 whose memory 135 stores an application program interface (API) 142 that enables switching system 101 and computer 103 to communicate with each other across LAN 104. Illustratively, switching system 101 is the Lucent Definity® PBX, LAN 104 is Cajun router, API 142 is the Lucent Definity API (DAPI), and connections over LAN 104 are made via a conventional sockets protocol. Memory 135 further stores a call-coverage-path application program 140. Address 124 of a subscriber's entry 122 is a LAN 104 address of program 140 in that subscriber's computer 103. The subscriber (user of computer 103) uses application program 140 to define one or more call-coverage paths 141 for himself or herself. If memory 135 of computer 103 includes the subscriber's scheduling system 145 (e.g. Microsoft Schedule+), a call-coverage path 141 may be defined to obtain some or all coverage-path data from system 145. Illustratively, communication between scheduling system 145 and application program 140 is via the Microsoft COM/DCOM API. Coverage paths 141 stay resident in memory 135 of computer 103. When switching system 101 needs a coverage path for a subscriber, it obtains the address 124 from the subscriber's list entry 122 and then uses address 124 to access application program 140 on the subscriber's computer 103 and obtain therefrom information on an active one of the subscriber's coverage paths 141. Application program 140 causes switching system 101 to create the subscriber's list entry 122 when the subscriber makes one of the coverage paths 141 active.

Figure 2:
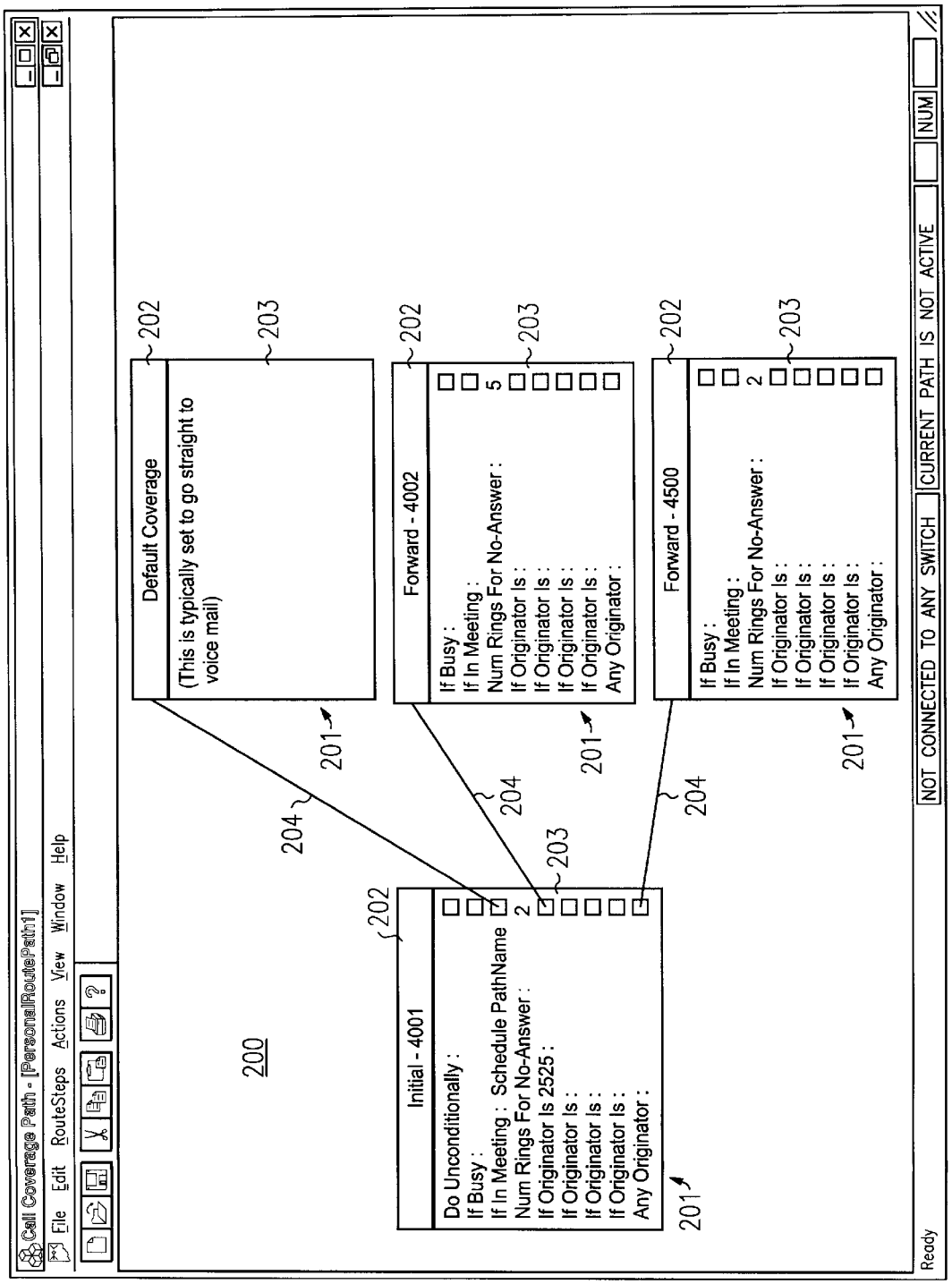
FIG 2. is a view of a call-coverage GUI of a computer of the system of FIG. 1.

Call-coverage application program 140 allows a subscriber of switching system 101 and user of computer 103 to administer his or her own call-coverage paths by drawing graphical flowcharts on a display 136 of computer 103. To define a call-coverage path, a user would perform the following actions. First, they would start execution of application program 140 and use its GUI to create a call-coverage path flowchart. An example of the GUI provided by program 140 and of a call-coverage path 141 flowchart 200 defined therethrough is shown in FIG. 2. A coverage path flowchart 200 can be defined either by retrieving a previously-saved flowchart or by drawing a new flowchart. To draw a flowchart 200, a user adds or deletes route steps 201 and draws connections 204 therebetween to define the logic flow from one route step 201 to another, based on a menu 203 of conditional rules given in each route step 201. Each route step 201 corresponds to a call-destination address—a telephone extension number 202 in this example. Initial route step 201 corresponds to the user's extension for which coverage is being provided; subsequent route steps 201 correspond to individual extensions in the call-coverage path for the user's extension. Route steps 201 and connections 204 are created with menu pulls and mouse movements.

Once the displayed flowchart 200 represents the coverage path 141 that the user desires, he or she needs to make sure that application 140 is connected to the particular switching system 101 of which they are a subscriber. This is accomplished by using a "Connect To Switch" dialog box to find their switching system 101 on LAN 104 and connecting to it via API 142. Once application program 140 is connected to the proper switching system 101, the user activates one of the call-coverage paths 141 (done with a menu pull), which causes an entry 122 to be created for this user in list 121. When a call-coverage path 141 is active, it is the call coverage path for the given user and overrides any call-coverage path that may be administered for that user on switching system 101. Preferably, if call-coverage path 141 becomes deactivated or application program 140 ceases to run or otherwise becomes disconnected from switching system 101, then a coverage path that is administered on switching system 101 takes over. If the user changes any of the logic in the presently-active call-coverage path 141, then it is automatically deactivated and the user must reactivate that coverage path 141 once they have made the desired changes.

Figure 3A:
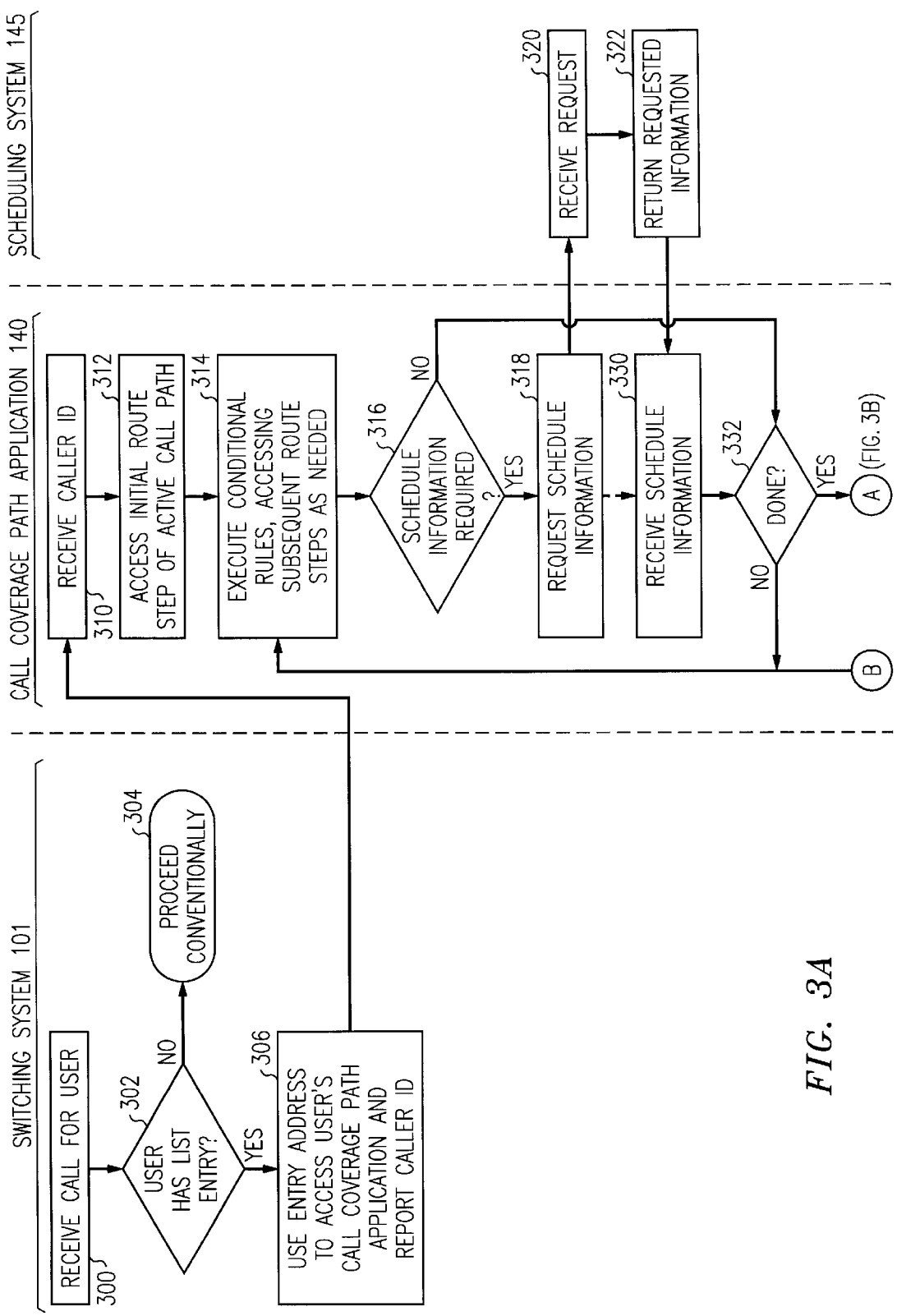
FIG. 3. is a functional flow diagram of operations performed by the system of FIG. 1 to provide call coverage for a subscriber/user of the system of FIG. 1.
Figure 3B:
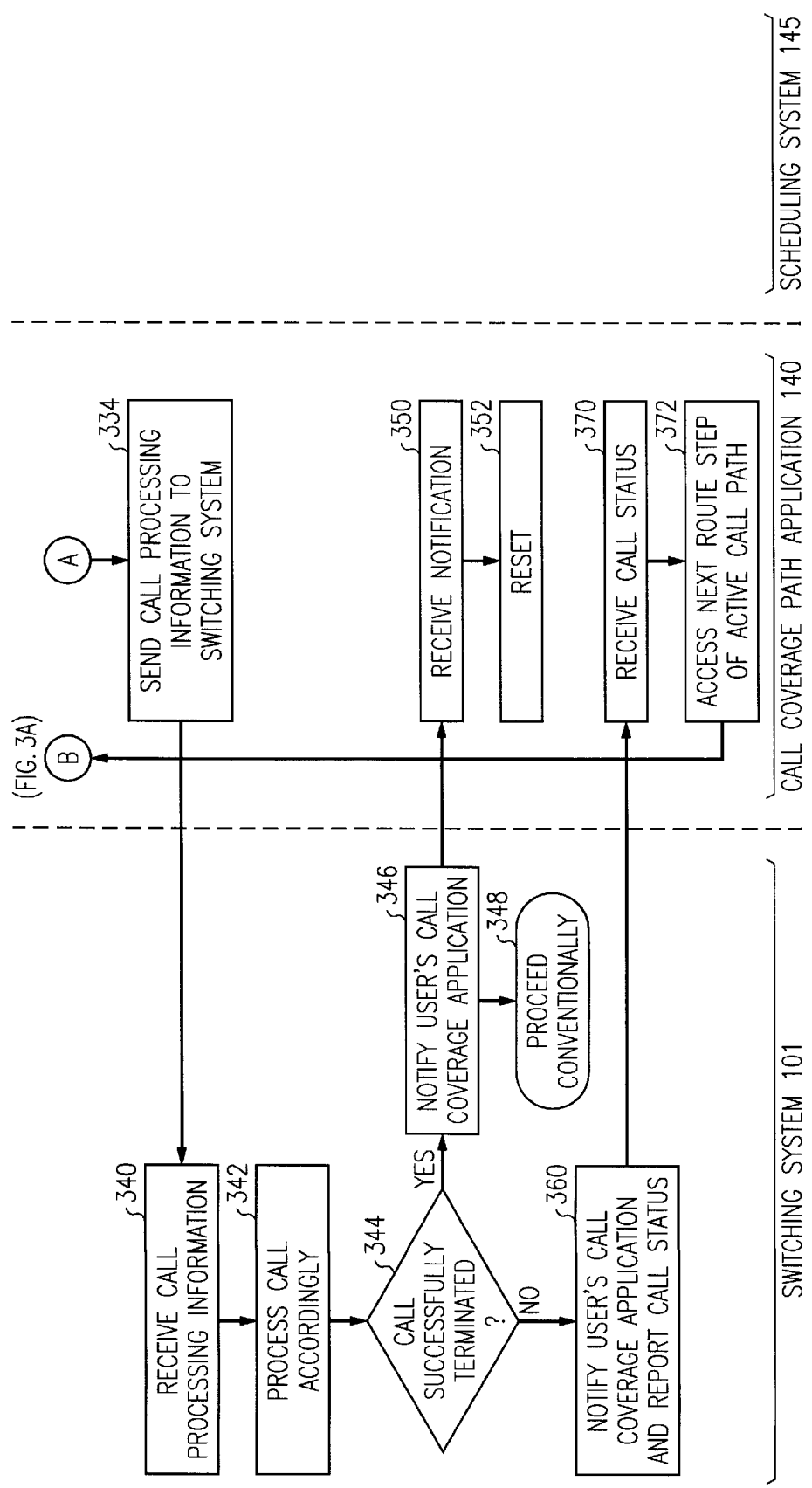

An example of interactions between switching system 101, application program 140, and scheduling system 145 is flowcharted in FIG. 3. When switching system 101 receives a call destined for a user/subscriber, at step 300, it checks whether that user/subscriber has an entry 122 in list 121 of call-coverage system 120, at step 302. If not, switching system 101 proceeds to process the call conventionally, at step 304. If the user/subscriber does have a list 121 entry 122, switching system 101 uses address 124 specified therein to contact the user's call-coverage path application 140 on the user's computer 103 and reports to application 140 call information including the caller's identification (extension number), at step 306.

Application 140 receives the call information including caller ID, at step 310, accesses initial route step 201 of flowchart 200 of the presently-active call coverage path 141, at step 312, and uses the received information in executing the conditional rules 203 specified by route step 201, at step 314. Execution of those rules may lead application 140 to access subsequent route steps 201 in flowchart 200 of the presently-active path 141 and to execute their conditional rules 203 as well, at step 314. If application 140 determines, at step 316, that a conditional rule requires schedule information of the user, it requests that information from scheduling system 145, at step 318. Scheduling system 145 receives the request, at step 320, and responds by returning the requested information to application 140, at step 322, which receives it at step 330. If no schedule information is found to be required at step 316, or following step 330, application 140 determines if it is done for the moment, i.e., if it has determined how switching system 101 should initially handle the call, at step 332. If not, it returns to step 314 to execute further conditional rules; if so, it sends the determined call-treatment information to switching system 101, at step 334.

Switching system 101 receives the information from application 140, at step 340, and processes the call accordingly, at step 342. If this processing results in the call being successfully terminated to a destination, as determined at step 344, switching system 101 notifies application 140 of the successful termination, at step 346, and then continues to process the call conventionally, at step 348. In response to the notification of successful call termination, received at step 350, application 140 resets itself to get ready to process another call for the user, at step 352. If, however, the call processing does not result in the call being successfully terminated, as determined at step 344, switching system 101 notifies application 140 and reports to it the present status of the call, at step 360. In response to receipt of the notification and call status, at step 370, application 140 accesses the next route step 201 in flowchart 200 of the active call path 141, at step 372, and returns to step 314 to execute the conditional rules 303 of the accessed route step 201.

As indicated in FIG. 2, one item of information that application 140 may need to obtain from scheduling system 145 is -whether the user is presently in a meeting. Other items of information to be obtained from system 145 may be the telephone number of the user's present location, whether the schedule entry is marked as "do no disturb", whether the user is at home or at lunch, and any other information that may be gleaned from a user's schedule that can impact how calls directed to the user should be processed.

Of course, various changes and modifications to the illustrative embodiment described above will be apparent to those skilled in the art. For example, instead of or in addition to the scheduling system, the invention may use other information systems such as a database, a present status of a particular Web site, a duration of inactivity at the user's computer, etc. Also, the call may be routed based on the originating phone number in a manner specified in a database or a spreadsheet of the user's information; for example, customers who are designated as "important" may be routed to a place other than to where "normal" customers are routed. Such changes and modifications can be made without departing from the spirit and the scope of the invention and without diminishing its attendant advantages. It is therefore intended that such changes and modifications be covered by the following claims except insofar as limited by the prior art.

What is claimed is:

1. A method of effecting call processing for a plurality of users served by a switching system, comprising:

in response to a first call to a communications terminal of a first one of the users for whom the call is destined, the switching system obtaining call-processing information of the first user from a first computer distinct from the switching system, of the first user by communicating with the first computer;

in response to obtaining the first call-processing information, handling the first call as directed by the first call-processing information;

in response to a second call to a communications terminal of a second one of the users for whom the call is destined, the switching system obtaining call-processing information of the second user from a second computer, distinct from the switching system and from the first computer, of the second user by communicating with the second computer; and in response to obtaining the second call-processing information, handling the second call as directed by the second call-processing information.

2. The method of claim 1 wherein:

each step of obtaining call-processing information comprises the switching system obtaining call-coverage information for a corresponding said user from the computer of the corresponding user.

3. The method of claim 2 wherein:

the call-coverage information for the first user is a function of a schedule of the first user; and obtaining call-coverage information for the first user comprises the first user's computer executing a scheduling program that defines the schedule of the first user;

in response to the switching system communicating with the first user's computer, the first user's computer obtaining information on the first user's schedule from the scheduling program;

the first user's computer using the obtained schedule information to determine the call-coverage information for the first user; and the first user's computer reporting the determined call-coverage information to the switching systems.

4. The method of claim 1 further comprising:

the first user using a graphical user interface of the first computer to define the call-processing information for the first user on the first computer.

5. A method of effecting call processing for a plurality of users in a communications system comprising telecommunications terminals of a plurality of users, a switching system serving the plurality of users and connected to their telecommunications terminals, and a plurality of computers distinct from and connected to the switching system, each corresponding to a different one of the users, comprising:

at least a first plurality of the users each storing their own call-processing information on their own computer;

in response to a call to a communications terminal of any one of the users of the first plurality for whom the call is destined, the switching system obtaining the call-processing information for the one user from the one user's computer by communicating with the one user's computer; and in response to obtaining the call-processing information from the one user's computer, handling the call as directed by the obtained call-processing information.

6. The method of claim 5 wherein:

users each storing their own call-processing information on their own computer comprises users each storing their own call coverage path on their own computer.

7. The method of claim 6 wherein:

storing comprises each of the first plurality of the users defining their own call-coverage path on their own computer via a graphical user interface by defining a flowchart comprising interconnected route steps a first one of which corresponds to a destination point of the call and each subsequent one corresponding to a different coverage point in the call-coverage path and each specifying conditions for selecting a connected one of the other route steps.

8. The method of claim 7 wherein:

obtaining comprises the switching system reporting a state of the call to the one user's computer;

the computer applying the reported state to the flowchart to determine call-coverage treatment of the call; and the computer reporting the determined call-coverage treatment to the switching system.

9. The method of claim 8 wherein:

obtaining further comprises in response to being unable to complete the call by handling the call as directed by the determined call-coverage treatment, the switching system reporting a new state of the call to the one user's computer;

the computer applying the reported new state to the flowchart to determine further call-coverage treatment of the call; and the computer reporting the determined further call-coverage treatment to the switching system.

10. The method of claim 6 wherein:

the stored call-coverage path of the one user is a function of a schedule of the one user; and obtaining comprises the one user's computer executing a scheduling program that defines the schedule of the one user, in response to the switching system communicating with the one user's computer, the one user's computer obtaining the one user's schedule information from the scheduling program, the one user's computer using the obtained schedule information to determine call-coverage treatment of the call, and the one user's computer reporting the determined call-coverage treatment to the switching system.

11. A method of effecting call processing for a user in a communications system comprising a at least one telecommunications terminal of the user, a switching system serving the user and connected to the telecommunications terminal, and a computer of the user distinct from and connected to the switching system, comprising:

the user storing in the computer the user's own call-processing information for processing exclusively calls to the user's telecommunications terminal and to no other users' terminals in the switching system; and in response to a communication from the switching system seeking call processing information exclusively for a call to the user's telecommunications terminal and not for calls to other users' terminals, the computer returning the stored call-processing information to the switching system to enable the switching system to handle the call as directed by the stored call-processing information.

12. The method of claim 11 wherein:

storing comprises the user storing in the computer the user's own call-coverage information; and returning comprises in response to the communication from the switching system seeking call-coverage information for the call, the computer returning the stored call-coverage information.

13. The method of claim 12 wherein:

storing comprises the user defining the users own call-coverage path on the user's computer via a graphical user interface by defining a flowchart comprising interconnected route steps a first one of which corresponds to a destination point of the call and each subsequent one corresponding to a different coverage point in the call-coverage path and specifying conditions for selecting a connected one of the other route steps.

14. The method of claim 13 wherein:

returning comprises in response to a communication from the switching system reporting a state of the call to the computer, the computer applying the s reported state to the flowchart to determine call coverage treatment of the call; and the computer returning the determined call coverage treatment to the switching system.

15. The method of claim 14 wherein:

returning further comprises in response to a communication from the switching system reporting a new state of the call upon being unable to complete the call by handling the call as directed by the determined call-coverage treatment, the computer applying the new state to the flowchart to determine further call coverage treatment of the call; and the computer returning the determined further call-coverage treatment to the switching system.

16. The method of claim 12 wherein:

the stored call-coverage path is a function of a schedule of the user; and reporting comprises the computer executing a scheduling program that defines the schedule of the user, in response to the communication from the switching system, the computer obtaining the user's schedule information from the scheduling program, the computer using the obtained schedule information to determine call-coverage treatment of the call, and the computer returning the determined call-coverage treatment to the switching system.

17. An apparatus for carrying out the method of claims 1 or 2 or 11 or 12 or 13 or 14 or 15 or 16.

18. A computer-readable medium containing software which, when executed in a computer, causes the computer to perform the method of claim 1 or 2 or 11 or 12 or 13 or 14 or 15 or 16.

* * * * *